May 30, 1939.  N. BORRESEN  2,160,117

FLUID CONTROL VALVE

Filed Jan. 11, 1937  2 Sheets-Sheet 1

Inventor.
Nico Borresen.

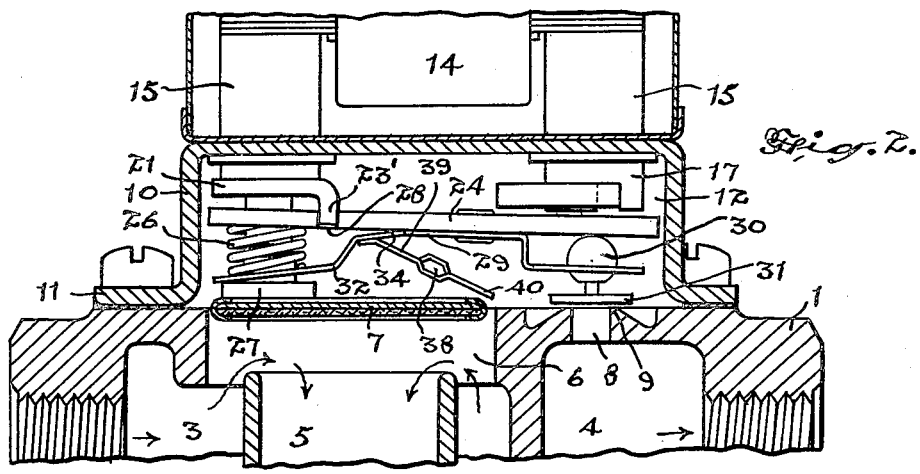
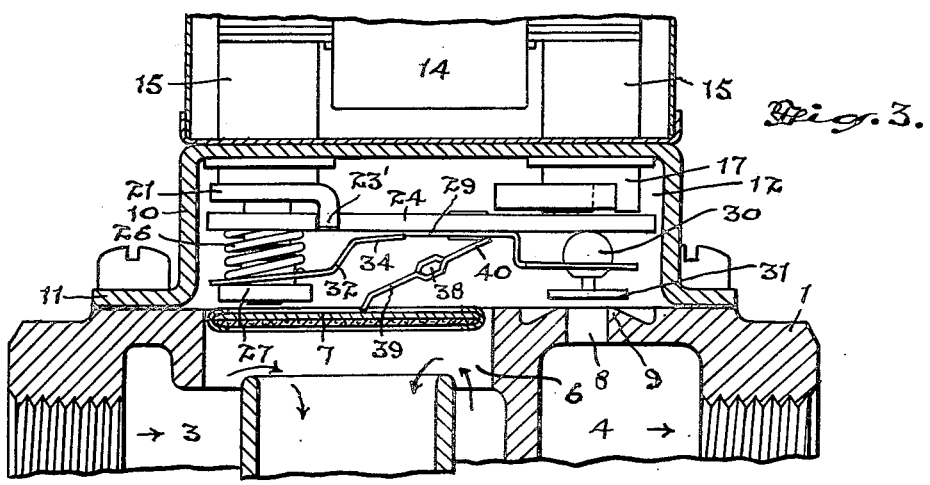
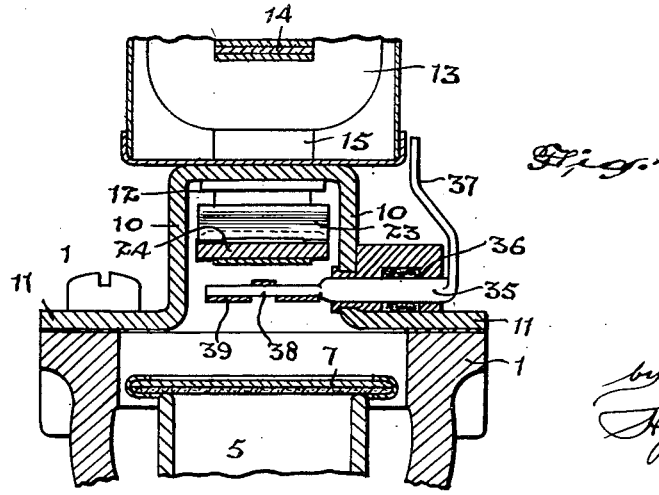

Patented May 30, 1939

2,160,117

UNITED STATES PATENT OFFICE 2,160,117

FLUID CONTROL VALVE

Nico Borresen, Buffalo, N. Y., assignor to Nicostat Products Inc., Buffalo, N. Y.

Application January 11, 1937, Serial No. 120,052

10 Claims. (Cl. 137—139)

The principal objects of this invention are to provide a valve adapted for use in the control of the flow of fluids which may be electrically or manually controlled and which will open or close quickly under the velocity flow or kinetic energy of the fluid being controlled.

A further object is to devise a structure which, though controlled electrically, may be opened manually in the event of failure in the electric control circuit, but will automatically resume its electric control on the return of the control current.

A still further and very important object is to provide a valve for the purpose above set forth, which will be extremely simple in its construction and reliable in operation, and which may be manufactured at very low cost.

The principal features of the invention consist in the novel application of an electro-magnetic control of a pressure relief valve controlling the pressure in a chamber housing a valve, which is opened by the velocity flow or kinetic energy of the fluid being controlled and closed by the pressure of such fluid following the closing of said relief valve, and in the novel construction and arrangement of manually operable means for opening and closing such relief valve.

In the accompanying drawings, Figure 1 is a longitudinal mid-sectional view of a valve constructed in accordance with this invention, the parts thereof being shown in the "closed" position.

Figure 2 is a part mid-sectional view showing the position of the parts when the valve is held open by the manually controlled means.

Figure 3 is a view similar to Figure 2 showing the position of the manually operated member in the act of releasing the valve for controlling the main valve.

Figure 4 is a transverse sectional view taken through the line 4—4 of Figure 1, showing the manual control device and showing the main valve closed.

Figure 1:
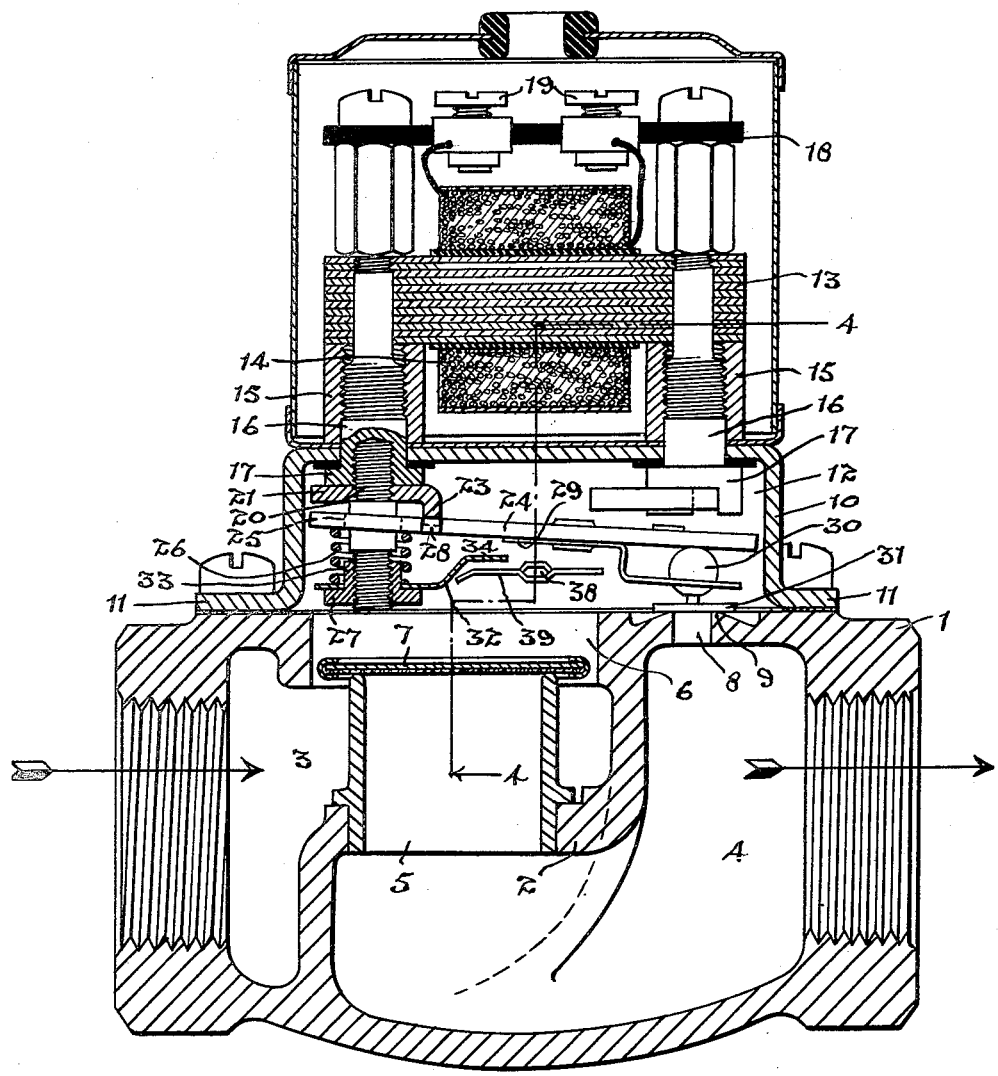

United States Patent No. 1,975,190 of October 2, 1934, illustrates a fluid valve in which a disc valve of considerably greater area than the outlet passage is arranged to float within a pressure chamber provided with a relief orifice controlled by a thermostatically operated valve, and the said disc valve closes against the inflowing fluid by the pressure which is built up on the top of the disc when the relief orifice is closed.

The present invention utilizes the general principles of the valve device disclosed in the said patent, but applies an entirely different means for operating the valve for controlling the relief orifice.

In the structure herein shown the valve body 1 is formed with the cross partition 2 separating the inlet 3 from the outlet 4 and in this partition 5 is arranged a cylinder 5 which extends into a cylindrical orifice 6, which is of considerably greater diameter than the exterior diameter of the cylinder 5.

A disc valve 7 of a suitable light construction and of greater diameter than the cylinder 5 rests upon the upper end of said cylinder which forms a valve seat. The exterior diameter of the valve 7 is smaller than the orifice 6 and fluid flowing into the valve body may flow around the perimeter of the valve.

A small port 8 with a valve seat 9 therearound is formed in the top wall of the valve body and communicates with the interior of said body on the outlet side of the partition 2.

A cap 10 preferably of oblong shape is formed with a lateral flange 11 at the bottom edge, which is secured in sealed contact with the top of the valve body, and encloses a pressure chamber 12 communication with the orifice 6 and the port 8.

Mounted on the cap 10 is an electro-magnet 13, the core 14 of which is supported on sleeves 15, which are clamped in position by studs 16 extending upwardly therethrough from within the cap 10, the flanges 17 of said studs being sealed against the inner wall of the cap. A bridge 18 of insulating material spans the top ends of the studs and carries the binding posts 19.

A stud 20 threaded into the bottom end of one of the studs 16 binds a plate 21 against the stud 16, and said plate is provided with a downturned fork end 23.

A flat bar 24 formed with a hole 25 adjacent to one end is loosely mounted on the stud 20 and is held against the worked end of the plate 21 by a compression spring 26 encircling said stud 20 and secured in place and with the desired tension by a nut 27 threaded on the lower end of the stud. The side members 23' of the forked plate 21 loosely engage in notches 28 in the edges of the bar 24 and hold the bar from side movement, while the bar fulcrums on the said fork end.

The free end of the bar 24 extends under the other stud 16 and forms a tiltable armature for the electro-magnet 13.

Secured to the underside of the bar 24 about midway of its length is a thin metal strip 29, which is offset downwardly and has a hole therein in which is loosely mounted a ball 30, to which a flat valve 31, which is adapted to engage the valve seat 9 of the port 8, is secured to close the same against the escape of fluid from the cap chamber 12.

A thin metal plate 32 loosely mounted on the boss 33 of the nut 27 and engaged by the bottom end of the spring 26, is formed with an upward offset extension 34, the free end of which is adapted to engage the adjacent end of the strip 29 secured to the underside of the bar 24 and interlocks therewith when pressed upwardly and holds the bar in a position to hold the valve 31 clear of the valve seat 9, with the said bar still spaced from the bottom end of the stud 16, which forms an extension of the magnet core, so that upon the core being energized electrically, the bar will be pulled slightly upward tilting on its fulcrum on the plate 21 so that the locking plate 32 will be released, and upon such release being effected the bar will be operated by the spring 26 to move downwardly and cause the valve 31 to close the port 8.

A spindle 35 is rotatably mounted in a sealed orifice 36 in one side wall of the cap 10 and is provided with an operating lever 37 on its outer end. The inner flattened end 38 of the spindle has rigidly secured thereon a plate 39, one end of which, on the rocking of the spindle, engages the plate 32 and presses same outwardly against its spring tension, so that the offset end presses the bar 24 outwardly until the end thereof engages in latching contact with the strip 29 on the innerside of the bar. The bar is thus held in a temporary position with the valve 31 clear of the port 8.

By turning the lever 37 in the opposite direction, the end 40 of the plate 39 engages the innerside of the bar 24 and tilts it to release the locking plate 32 to close the valve 31 against the port 8. The plate 32 may, however, be released by the energizing of the magnet as previously described.

In the operation of the valve, the gas, steam, water or other fluid under pressure flows in the direction indicated by arrow in Figure 1 and flowing around the disc valve 7 fills the chamber 12. If the port 8 is closed, the pressure applied to the larger area of the valve 7 holds it tightly against the seat at the end of the cylinder 5. If, however, the port 8 is open and the fluid flowing into the chamber 12 has an outlet, the upward flow around the cylinder 5 moves the valve 7 from its seat and said valve remains in suspension with the outlet wide open through the cylinder 5. The port 8 may be opened by electrically energizing the electro-magnet to operate the bar 24 to move the valve 31 from its seat, but upon the magnet being de-energized, the valve 31 closes through the action of the spring 26 and pressure instantly builds up within the cap chamber 12 and forces the valve 7 firmly upon its seat.

If through accidental failure of current to the operating magnet, the valve is closed, it may be opened by operating the lever 37 as described and the valve 31 will remain open until closed manually, or if the flow of current to the magnet is resumed, the locking member 32 will be released and when the flow of current ceases, the valve 31 will be automatically closed.

It will be appreciated from the description that the device herein described may be manufactured at very low cost, which will enable its use in many places where hitherto the cost of adequate control devices have been prohibitory.

Further the device is very simple and there are no delicate parts to become broken or disorganized so as to impair its operation.

The valve structure is herein shown with the magnet control arranged at the uppermost side, but it must be understood that the structure will operate successfully when turned with the magnet at the side or even underneath the main valve body.

What I claim as my invention is:

1. In a fluid control valve having a valve body provided with a passage to be controlled, an electro-magnet mounted on said body having a core portion, a stud spaced from core portion, a magnetically displaceable bar having a hole therein loosely receiving said stud and adapted to swing toward said magnet core portion, a fulcrum engaging said bar intermediate of its length, a spring engaging said bar to urge the free end thereof away from said magnet core portion, a valve carried by said bar to close said passage, a plate loosely mounted on said stud and engaged by said spring to swing away from said bar, a stop on said bar to be engaged in locking contact with said plate, and means for moving said plate into locking engagement with the stop on said bar.

2. A fluid control valve as claimed in claim 1 in which the means for moving the bar-locking plate to locking position comprises a manually operable tiltable member.

3. In a fluid control valve having a valve body provided with a passage to be controlled, an electro-magnet mounted on said body having a core, an armature pivotally mounted and adapted to swing to and from said magnet core, a valve carried by said armature adapted to close said passage, a tiltable member movable into locking engagement with said armature, a spindle rotatably mounted having a lever extension to be manually operated, and an operating extension secured on said spindle within the chamber having one end arranged to engage said tiltable plate to move it into locking engagement with said armature and the other end arranged to engage the armature to release it from locking engagement with said plate.

4. In a fluid control valve having a passage to be controlled, means for controlling said passage including an electro-magnet having an armature, a fulcrum engaging said armature intermediate of its length, a valve connected with said armature to open and close said passage, and a compression spring engaging said armature to bear the same against said fulcrum and tilt one end thereof away from the magnet core to operate the valve to close said passage.

5. In a fluid control valve having a passage to be controlled, means for controlling said passage including an electro-magnet having an armature, said armature being mounted to tilt on a fulcrum, a control valve connected with one end of said armature for co-operation with said passage, a compression spring engaging one end of said armature to tilt the armature about the fulcrum and move the valve-operating end away from the operating magnet core, a projection on said armature, and a member tiltably mounted to engage said projection on the armature to lock it with the valve head clear of said passage.

6. In a fluid control valve having a passage to be controlled, means for controlling said passage including an electro-magnet having an armature operating in said pressure chamber, said armature being mounted to tilt, a valve operatively connected with one end of said armature for controlling said passage, a compression spring engaging said armature to tilt the valve-operating end away from the operating magnet core to permit the valve to close, a projection on said armature, and a member tiltably mounted to engage said projection on the armature to lock it with the valve held clear of the passage, said spring cooperating with said tiltable member to move same away from said armature upon the relief of the pressure of said armature against said plate.

7. In a fluid control valve having a passage to be controlled, means for controlling said passage including a valve for opening and closing said passage and electro-mechanical means controlling the opening and closing of said valve including a magnetically responsive member for actuating said valve, a member displaceable into locking relation to the magnetically responsive member to hold the valve open and automatically displaceable from locking relation to the magnetically responsive member on the further movement thereof in the valve opening direction, and a common spring means for resiliently exerting a valve-closing pressure on the magnetically responsive member and for resiliently urging said displaceable member toward its unlocking position.

8. In a fluid pressure control valve having a passage to be controlled, means for controlling said passage including an electro-magnet having an armature and a valve for closing said passage operatively connected with said armature, means operable to hold said armature with the valve clear of the passage and releasable only by a further valve opening displacement of said armature, and manual means selectively operable to engage and operate said latter means and said armature and adapted to effect said further valve opening displacement of the latter.

9. In a fluid control valve having a passage to be controlled, means for controlling said passage including an electro-magnet having an armature and a valve operatively connected with said armature and adapted to close said passage, means operable to hold said armature with the valve clear of the passage and releasable only by a further valve opening displacement of said armature, and means displaceable in one direction to engage said operable means to move the same and the armature to valve-opening position and displaceable in the reverse direction to impart said further valve-opening displacement to the armature, to thereby release said operable means and permit movement of the armature to valve-opening position.

10. In a fluid control valve having a valve body provided with a passage to be controlled, an electro-magnet mounted on said body having a core extending therefrom, an armature pivotally mounted and adapted to swing to and from said magnet core, a valve carried by said armature adapted to close said passage, a plate tiltably mounted to swing in the plane of swing of said armature into operating and locking engagement with said armature, said armature being movable beyond its locked position to release the same from locking engagement with said plate, and manually operable means engageable with said tiltable plate to first swing and lock the armature in one position and being separately engageable directly with the armature to swing same beyond its locked position and permit return of the plate and armature.

NICO BORRESEN.